United States Patent [19]

Kaiserfeldt

[11] Patent Number: 4,771,699
[45] Date of Patent: Sep. 20, 1988

[54] DEVICE FOR CABLE TRANSPORT
[75] Inventor: Guido Kaiserfeldt, Stockholm, Sweden
[73] Assignee: ITT Flygt AB, Solna, Sweden
[21] Appl. No.: 32,904
[22] Filed: Mar. 31, 1987
[30] Foreign Application Priority Data Apr. 9, 1986 [SE] Sweden ................................ 8601584

[51] Int. Cl.⁴ ............................................. B61B 3/00
[52] U.S. Cl. ..................................... 104/127; 405/2; 405/78
[58] Field of Search .................. 104/127; 405/2, 3, 78

[56] References Cited
U.S. PATENT DOCUMENTS 4,437,017  3/1984  Osterberg ............................... 290/52

Primary Examiner—Henry A. Bennet
Attorney, Agent, or Firm—Menotti J. Lombardi

[57] ABSTRACT

A device for transport of a cable in vertical shafts, in which the cable is attached to a number of sliding means at regular intervals and arranged to slide or roll along a vertical guiding rail. The sliding means are also rigidly attached to a lifting wire at regular intervals.

6 Claims, 3 Drawing Sheets

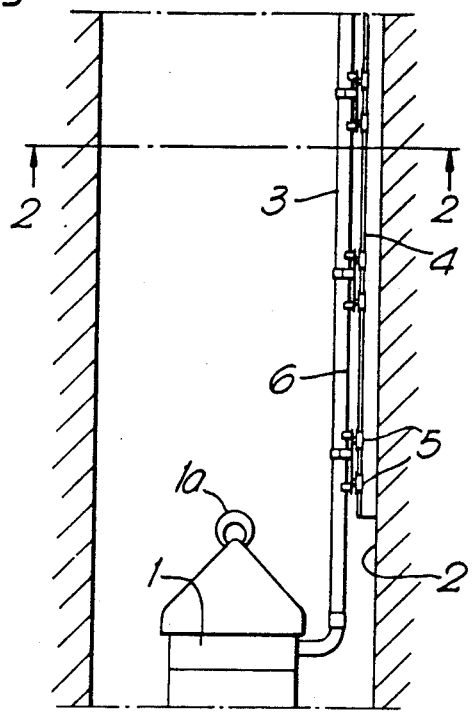
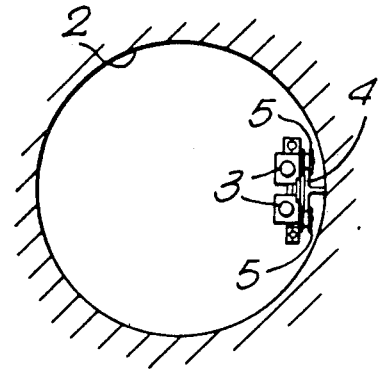
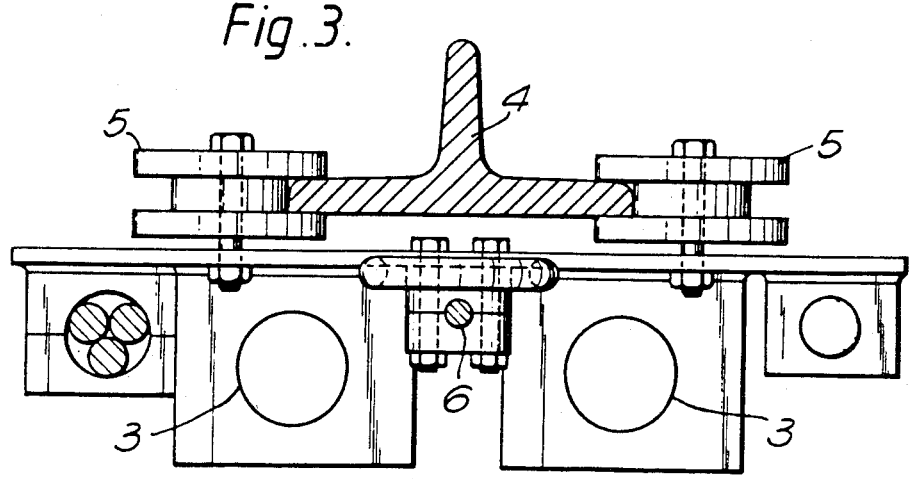

DEVICE FOR CABLE TRANSPORT

BACKGROUND OF THE INVENTION

This invention relates to a device for transport of a cable in vertical shafts.

At installations of submersible pumps, mixers and turbines in vertical or inclined shafts, the submersible unit must be able to be taken up and out of the shaft for service. An example of such an installation is shown in the U.S. Pat. No. 4,437,017.

A problem which occurs in this type installation is that the electric cable connected to the pump or the turbine unit may be squeezed and damaged during lifting of the unit. This is particularly true in deep shaft installations where it is almost impossible to visually observe the cable during the initial part of the lifting. Up to now the lifting of the cable has been carried out more or less by instinct, which of course is not satisfactory. In addition the cable may begin to swing and wear against surrounding parts thus raising the risk for cable breakage.

Accordingly, the problem of protecting the cable during lifting and lowering of the submersible unit is solved by the device of the invention.

SUMMARY OF THE INVENTION

An object of the invention is to provide an improved device for transport of a cable in vertical or inclined shafts.

According to the broader aspects of the invention, a cable is attached to a number of sliding means or rollers at regular intervals and arranged to slide or roll along a vertical guiding rail. The sliding means are also attached to a lifting wire unit at regular intervals.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a section view illustrating the preferred embodiment of the invention; and FIG. 2 is a sectional view along lines 2—2 of FIG. 1.

FIG. 3 is an enlarged view of the arrangement shown in FIG. 2; and

DETAILED DESCRIPTION OF THE PREFERRED EMBODIMENT

Figure 4:
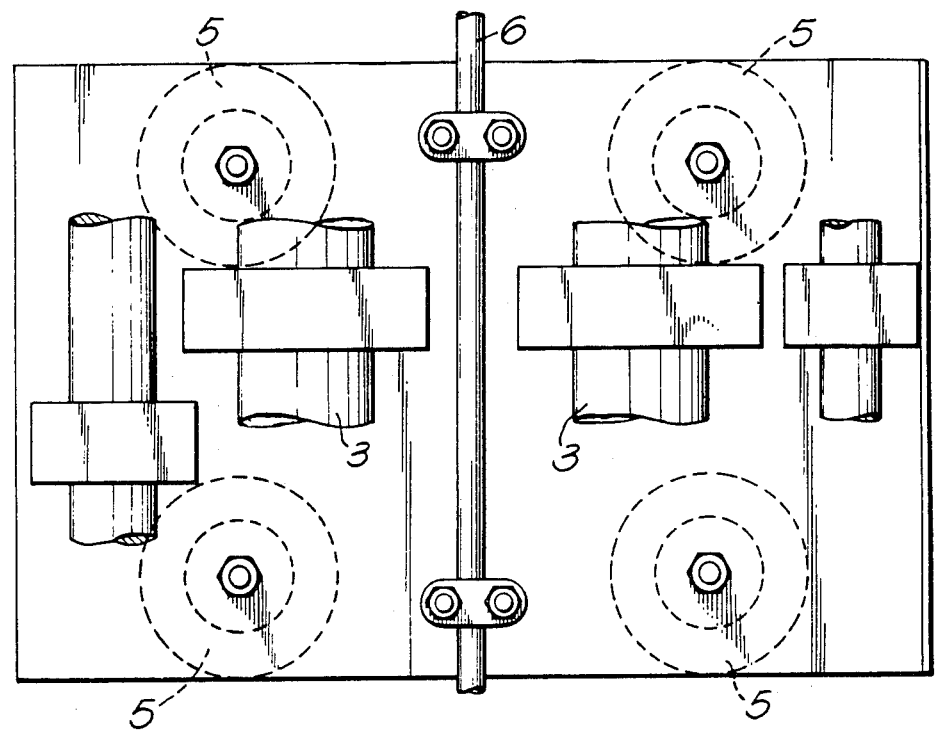
FIG. 4 is a partial frontal view of FIG. 3 to further illustrate the arrangement of the invention.

Referring to the FIGS. 1 and 2, a submersible pump or turbine unit 1 is lowered or raised along a vertical shaft tube 2. An electric cable 3 is connected to the submersible unit which may be lowered or raised by, for example, a ring 1a.

A T Shaped guiding rail 4 is arranged within the tube 2 and the web of the rail is attached to the tube wall. The rail extends along the entire length from the upper end of the tube down to the working level of the unit 1. The rail is positioned so that it does not interfere with the unit when the latter is moved up and down within the tube shaft.

Referring additionally to FIGS. 3 and 4, a number of sliding means or rollers 5 are mounted to be moved along the rail 4. Means 5 is connected to a lifting wire 6 at predetermined distances by a clamp or other attachment means. The electric cable 3 of the unit 1 is connected to the means 5 and is thus kept near the tube wall when unit 1 is operating.

The unit can be raised by a lifting type arrangement positioned at the upper end of the tube 2, which arrangement can be a motorized steel cable connected to the unit to transport the unit at a predetermined speed. The same lifting arrangement or a separate one, can uniformly lift the lifting wire 6 at the same speed. The sliding means or rollers 5 and the electric cable 3 will then be lifted at a correct speed avoiding squashing or squeezing as well as a stretching of the cable.

The lifting wire 6, the slide or rollers 5, and the cable 3 may be wound on a suitable drum positioned at the upper end of the tube or stored in some other manner until the unit 1 is lowered into the tube. The unwinding from the drum s then carried out at a speed corresponding with the lowering speed of the unit, either mechanically or manually.

By help of the invention a very reliable way to handle the electric cable of a submersible pump or turbine unit is achieved, whereby the chance of damage caused by squashing or squeezing the cable is eliminated. In addition the cable is safely secured during operation to additionally increase safety.

While the present invention has been disclosed in connection with a preferred embodiment thereof, it should be understood that there may be other embodiments which fall within the spirit and scope of the invention as defined by the following claims.

What is claimed is:

1. The combination comprising:
   a tubular shaft;
   a submersible unit capable of being raised and lowered within said tubular shaft;
   an electrical cable connected to said submersible unit for electrically operating said unit;
   a lifting wire for said cable;
   a guiding rail attached along said tubular shaft;
   sliding means engaging said rail at regular intervals; and
   means rigidly attaching said cable and wire to said sliding means, said attaching means safely securing said cable during raising and lowering of said unit.

2. The combination of claim 1 wherein said guiding rail has a T-formed cross-section and a web portion of said T-formed cross-section is attached to the wall of said tubular shaft.

3. The combination of claim 1 wherein said sliding means includes a plurality of sliding devices engaging said rail at regularly spaced intervals.

4. In an arrangement having a submersible unit installed within a vertical or inclined pipe, the combination comprising:
   an electrical cable connected to said submersible unit for electrically operating said unit;
   a lifting wire;
   a plurality of roller means arranged to engage said rail at spaced intervals; and
   means for rigidly attaching said cable and wire to said plurality of roller means, said attaching means securing said cable and wire to the roller means during raising and lowering of said unit within said pipe.

5. The combination of claim 4, wherein said guiding rail has a T-formed cross-section a web portion of said T-formed cross-section being attached along the axis of the inner wall of said pipe.

6. The combination of claim 5 wherein each said roller means includes a plurality of roller devices, each roller device being positioned to engage said rail along its length, and each roller device being rigidly attached to said cable and wire.

* * * * *